US012258780B1

(12) United States Patent
Mims

(10) Patent No.: US 12,258,780 B1
(45) Date of Patent: Mar. 25, 2025

(54) REMOVEABLE ABOVE-GROUND STORM SHELTER AND METHOD OF USE

(71) Applicant: Vincent D. Mims, Owasso, OK (US)

(72) Inventor: Vincent D. Mims, Owasso, OK (US)

( * ) Notice: Subject to any disclaimer, the term of this patent is extended or adjusted under 35 U.S.C. 154(b) by 0 days.

(21) Appl. No.: 17/457,638

(22) Filed: Dec. 3, 2021

(51) Int. Cl.
*E04H 9/14* (2006.01)
*E04B 1/343* (2006.01)

(52) U.S. Cl.
CPC .......... *E04H 9/14* (2013.01); *E04B 1/34384* (2013.01)

(58) Field of Classification Search
CPC .............................. E04H 9/14; E04B 1/34384
USPC ........................................................ 52/169.1
See application file for complete search history.

(56) References Cited

U.S. PATENT DOCUMENTS

| 4,787,181 | A | 11/1988 | Witten et al. | |
|---|---|---|---|---|
| 5,148,646 | A * | 9/1992 | Lutostanski | E04H 15/34 52/63 |
| 6,131,343 | A | 10/2000 | Jackson | |
| 6,308,466 | B1 | 10/2001 | Moriarty | |
| 6,334,278 | B1 * | 1/2002 | Arnold | E04H 9/06 52/79.5 |
| 6,415,557 | B1 | 7/2002 | McCalley | |
| 6,415,558 | B1 * | 7/2002 | Cherry | E04H 9/14 52/270 |
| 7,559,715 | B2 | 7/2009 | Germain et al. | |
| 7,690,159 | B1 | 4/2010 | Arnold | |
| 7,841,355 | B2 * | 11/2010 | Livacich | E04H 15/001 135/120.3 |
| 8,429,858 | B1 * | 4/2013 | Robinson | E04H 1/005 52/63 |
| 8,683,757 | B2 | 4/2014 | D'Ancona | |
| 8,776,453 | B1 | 7/2014 | Fain | |
| 8,925,261 | B1 | 1/2015 | Kouba | |
| 8,991,112 | B2 * | 3/2015 | Crow | E04H 9/14 52/169.6 |

(Continued)

FOREIGN PATENT DOCUMENTS

| CH | 165072 | 1/1934 |
|---|---|---|
| GB | 2465330 | 5/2010 |

OTHER PUBLICATIONS

Arkansas Storm Shelters, https://arkansasstormshelter.com/installation-bolt.php (publication date unknown).

(Continued)

*Primary Examiner* — James J Buckle, Jr.
(74) *Attorney, Agent, or Firm* — Margaret S. Millikin

(57) ABSTRACT

A storm shelter or kit for a storm shelter having a plurality of removable frames and a plurality of removable skins removably receivable on or within the removable frames and secured together by removable fasteners that are not bolted in place. A hollow tube fastener, having a hollow tube guide and a removeable pin receivable therethrough, is configured on a surface of the removable skins to hold the removable skins in assembled configuration with the removable frames. The removable skins are securable from the interior of the shelter, allowing the occupant to remove the skins from within the interior by removing the pins from the fasteners. The storm shelter provides a door with hinges that may be removed from the exterior by rescue personnel. The storm shelter is approximately the size of a garage workbench and can be sold as a kit and assembled using minimal construction skills.

30 Claims, 12 Drawing Sheets

(56) References Cited

U.S. PATENT DOCUMENTS

| | | | |
|---|---|---|---|
| 9,121,188 B2 | 9/2015 | von Bereghy | |
| 9,316,015 B1 | 4/2016 | Elliott | |
| 9,394,714 B1* | 7/2016 | Willsey | E04H 1/005 |
| 9,657,490 B1* | 5/2017 | Willsey | E04C 2/38 |
| 10,260,272 B1* | 4/2019 | Ivester | E05G 1/024 |
| 10,538,908 B1* | 1/2020 | Wilson | E04H 9/14 |
| 2001/0039770 A1* | 11/2001 | Arnold | E04H 9/14 |
| | | | 52/169.6 |
| 2003/0041540 A1* | 3/2003 | Gravel | E04B 2/7422 |
| | | | 52/656.1 |
| 2006/0000499 A1* | 1/2006 | Livacich | E04H 15/44 |
| | | | 135/90 |
| 2008/0006317 A1* | 1/2008 | Livacich | E04H 15/44 |
| | | | 135/123 |
| 2009/0038243 A1 | 2/2009 | Heltai | |
| 2010/0115858 A1* | 5/2010 | Olsen | E04H 9/14 |
| | | | 49/476.1 |
| 2011/0023759 A1* | 2/2011 | Waller | F41H 5/24 |
| | | | 52/173.1 |
| 2014/0083023 A1* | 3/2014 | King, III | E02D 5/801 |
| | | | 52/741.11 |
| 2015/0096478 A1* | 4/2015 | Magiera | E04H 9/14 |
| | | | 109/23 |
| 2016/0130830 A1* | 5/2016 | Magiera | E04H 9/06 |
| | | | 109/1 S |
| 2018/0266459 A1* | 9/2018 | Kubiniec | F16B 5/0036 |
| 2022/0145647 A1* | 5/2022 | Armstrong | E04G 17/0754 |
| 2022/0186500 A1* | 6/2022 | Vasylynyn | E06B 9/0638 |
| 2023/0279686 A1* | 9/2023 | Condra | E04H 5/08 |
| | | | 52/101 |

OTHER PUBLICATIONS

The Home Depot, Survive a Storm Shelters In Garage 4 ft×8 ft Tornado Storm Shelter, https://www.homedepot.com/p/Survive-a-Storm-Shelters-In-Garage-4-ft-x-8-ft-Tornado-Storm-Shelter-SASGM0804/204999915 (Sep. 18, 2014).

Vault Pros USA, Modular Storm Shelter Safe Rooms, https://www.vaultprousa.com/modular-storm-shelter-safe-rooms (Feb. 7, 2020).

* cited by examiner

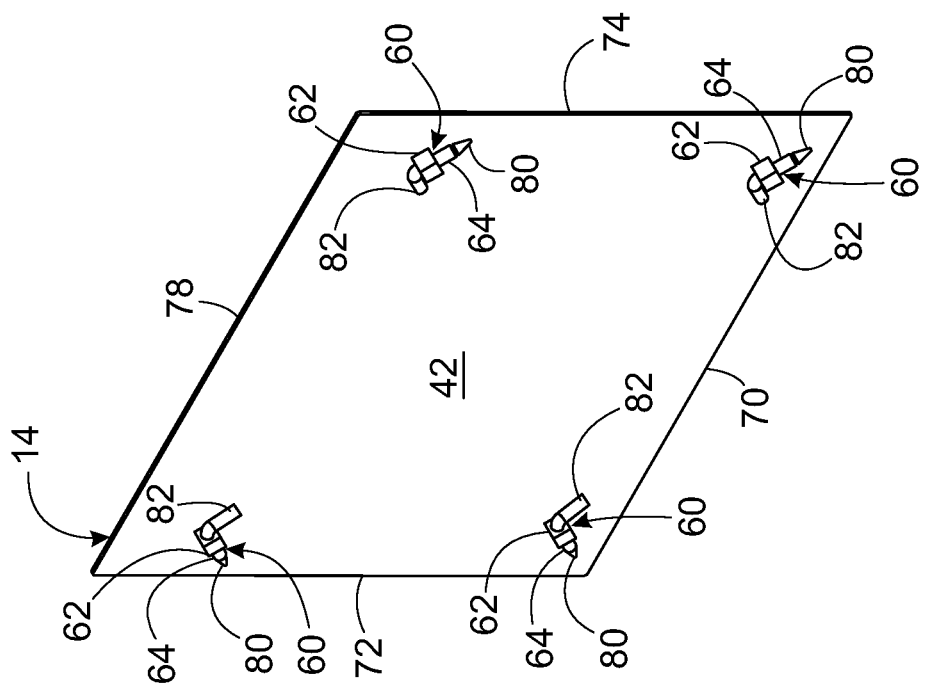
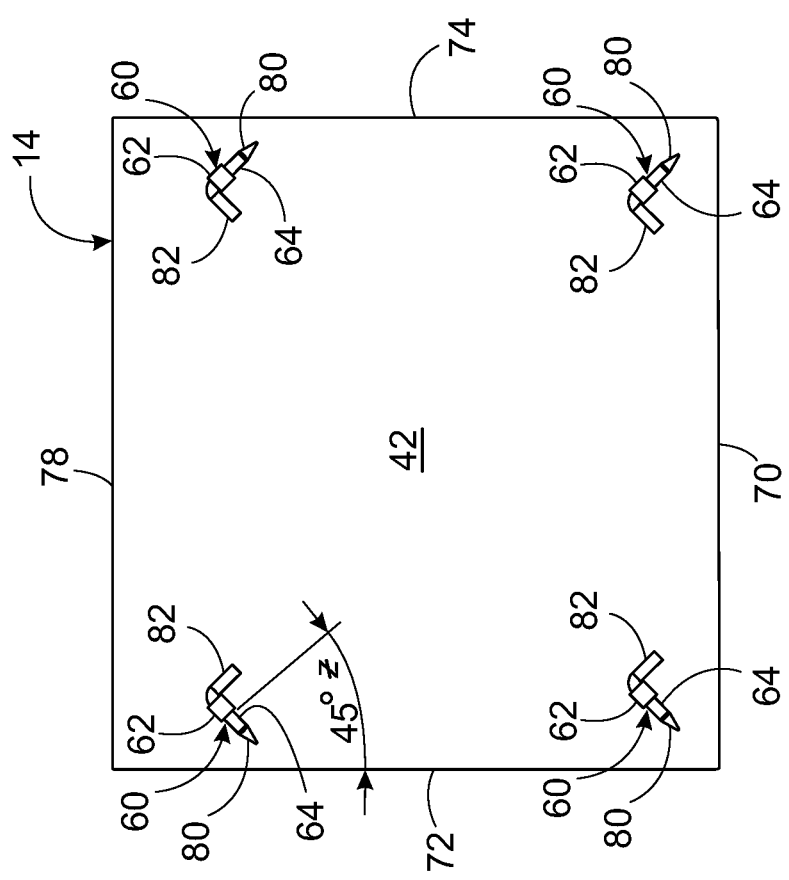
FIG. 4C
FIG. 4D

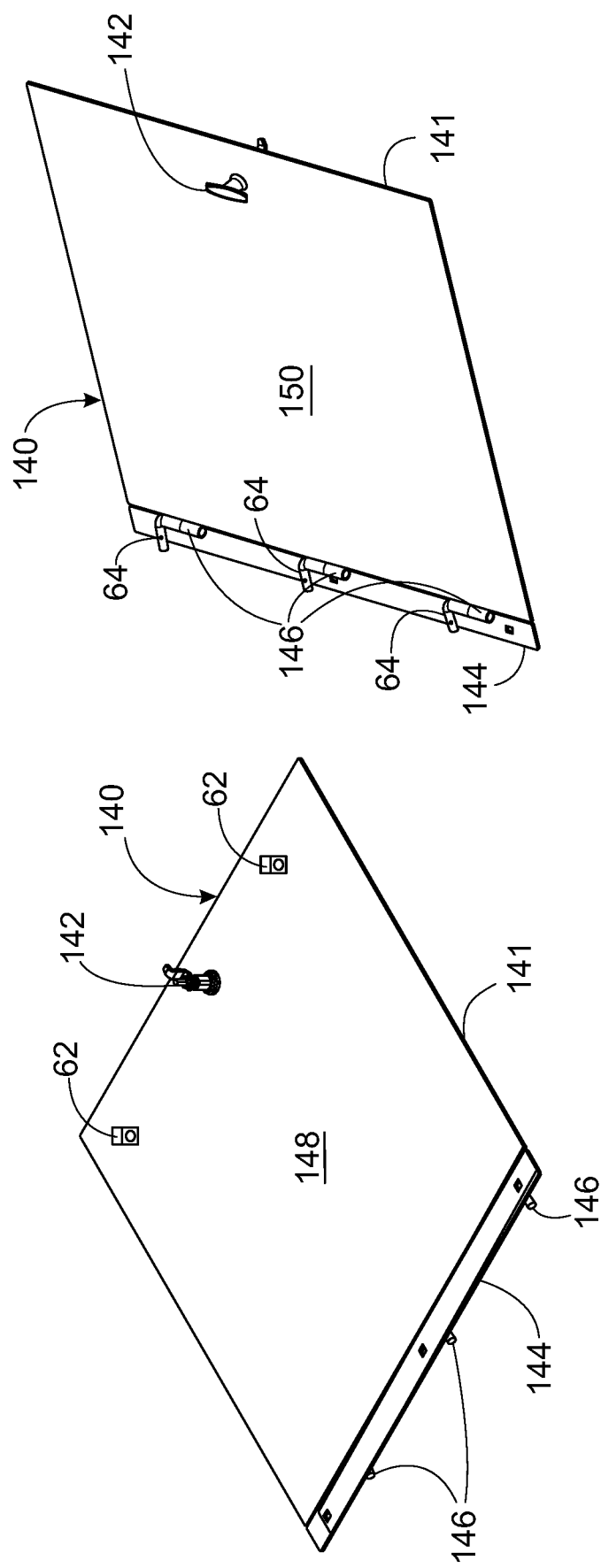

REMOVEABLE ABOVE-GROUND STORM SHELTER AND METHOD OF USE

TECHNICAL FIELD OF THE INVENTION

The present invention relates generally to storm shelters and, more particularly, but not by way of limitation, to residential, above-ground safe rooms, and assembly kits therefor, that are removable and transportable comprising removable frames and skins. The present invention also relates to removable skins for a storm shelter having removable fasteners that do not have to be bolted in place. The present invention further relates to methods of using a removeable, above-ground storm shelter.

SUMMARY OF THE INVENTION

The present invention is directed to a transportable storm shelter for providing shelter from tornadoes, hurricanes, straight line winds and high wind weather events, the transportable storm shelter forming an interior space and comprising: a plurality of removable frames, wherein each of the plurality of removable frames has in whole or in part a unitary planar geometry having an interior planar surface, an exterior planar surface and a perimeter and further comprises a flange extending radially from the perimeter; a plurality of removable skins, wherein each of the plurality of removable skins has an interior surface and is removably receivable on or within one of the plurality of removable frames; at least one removable fastener that is not bolted in place and is configured to hold at least one of the removable skins in assembled configuration with at least one of the plurality of removable frames, wherein the removable fastener is secured to the interior surface of the at least one of the plurality of removable skins; and the at least one of the plurality of removable skins is configured to be removed from the at least one of the plurality of removable frames from the interior space of the transportable storm shelter by release of the removable fastener; and at least one removable roof skin comprising a unitary planar geometry, in whole or in part, and having an interior planar surface, an exterior planar surface, a perimeter and a flange extending radially from the perimeter of the removable roof skin; wherein the transportable storm shelter forms a rectangular prism having two opposing sides, each having a length, and two opposing ends, each having a length; the length of the two opposing sides is longer than the length of the two opposing ends; and the plurality of removable frames is configured to form the opposing sides of the transportable storm shelter.

The present invention further is directed to a method of using a storm shelter, the shelter having sides and forming an interior safe space, the method comprising the steps of: providing a removable skin to form a side of the shelter; and securing, from within the interior safe space, the removable skin to form a side of the shelter.

The present invention further is directed to a removeable skin for a storm shelter, comprising: a planar geometry and forming an exterior planar surface and an exterior planar surface; and a removeable fastener that does not have to be bolted in place.

The present invention further is directed to an assembly kit for a transportable storm shelter for providing shelter from tornadoes, hurricanes, straight line winds and high wind weather events, the transportable storm shelter forming an interior space and comprising: a plurality of removable frames, wherein each of the plurality of removable frames has, in whole or in part a unitary planar geometry having an interior planar surface, an exterior planar surface and a perimeter and further comprises a flange extending radially from the perimeter; a plurality of removable skins, wherein each of the plurality of removable skins has an interior surface and is removably receivable on or within one of the plurality of removable frames; at least one removable fastener that is not bolted in place and is configured to hold at least one of the plurality of removable skins in assembled configuration with at least one of the plurality of removable frames, wherein the removable fastener is secured to the interior surface of the at least one of the plurality of removable skins and the at least one of the plurality of removable skins is configured to be removed from the at least one of the plurality of removable frames from the interior space of the transportable storm shelter by release of the removable fastener; and at least one removable roof skin comprising a unitary planar geometry, in whole or in part, and having an interior planar surface, an exterior planar surface, a perimeter and a flange extending radially from the perimeter of the removable roof skin; wherein the transportable storm shelter forms a rectangular prism having two opposing sides, each having a length, and two opposing ends, each having a length; the length of the two opposing sides is longer than the length of the two opposing ends; and the plurality of removable frames is configured to form the opposing sides of the transportable storm shelter.

BRIEF DESCRIPTION OF THE DRAWINGS

FIG. 4C is a plan view of an interior planar surface of the illustrative removable skin of FIG. 4A.

FIG. 4D is a perspective view of the interior planar surface of the illustrative removable skin of FIG. 4C, after being broken for assembly.

FIG. 7A is a perspective view of an interior surface of an illustrative door of the present invention.

FIG. 7B is a perspective view of an exterior surface of the door of FIG. 7A.

DETAILED DESCRIPTION OF THE INVENTION

Figure 1:
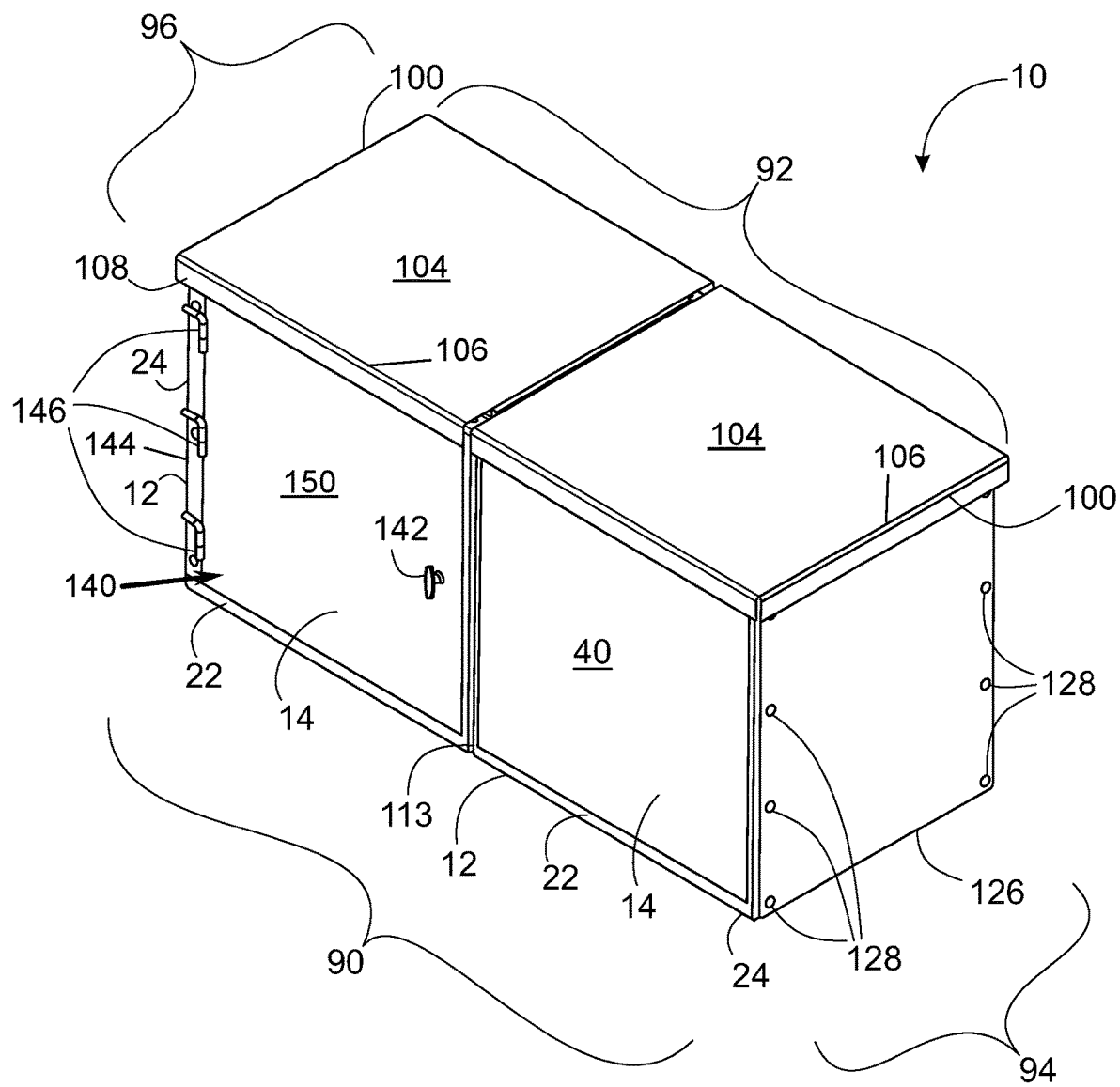
FIG. 1 is a perspective view of an illustrative storm shelter of the present invention.

Storm shelters offer fortification in various forms and structures, most of which are either immovable or ill adapted to varying spaces limitations and conditions. Many storm shelters comprise permanent subterranean structures constructed in embankments or underneath a home or other building. Embankment shelters are constructed with the entrance door positioned angularly with respect to level ground, while subterranean storm shelters constructed underneath a building are designed so that the door is flat with the ground and accessed from the garage or other interior space. This latter type of underground sheltering unit is installed within an excavation stabilized beneath a building, from which occupants enter. The walls and the ceilings of these shelters are constructed to withstand a variety of extreme weather conditions.

Subterranean shelters typically are quite expensive and are made of materials such as concrete and reinforced steel, which are difficult to install and cannot be moved without destroying the shelter or damaging the building under which they rest. Ground water levels, geophysical formations and building limitations may restrict the applicability of subterranean shelters in certain circumstances or locations. Moreover, elderly and disabled individuals with limited mobility may experience restricted access, while people with subterraneapremortephobia or taphophobia may be impacted and even immobilized by fears arising while within subterranean storm shelters.

Above-ground shelters, or safe rooms, offer adequate protection from dangerous storms while minimizing the complications associated with subterranean storm shelters. In fact, studies have shown that above-ground shelters are just as effective as in-ground shelters in offering high-levels of safety for occupants. In areas that are prone to flooding, above-ground safe rooms may be preferred. They offer quick, convenient access for those with mobility issues and alleviate phobias induced by use of subterranean shelters.

Above-ground shelters typically are installed inside a home, garage, or outbuilding, or as a stand-alone unit. These shelters may be poured on site with concrete or prefabricated from steel, then transported to and installed via anchors inside a residential, industrial or commercial building. One method of installation entails the use of a steel anchor that is attached to the shelter, dropped into a deep hole and backfilled with concrete. At the bottom of the anchor, an expansion means further may be employed to wedge the anchor in place within the hole. The anchor is not removable, unless the concrete is broken. Alternatively, the shelter may be anchored with bolts drilled into the concrete slab on which the shelter rests. Most above-ground shelters require installation by a professional. Consequently, even above-ground shelters can be complicated and expensive to install, and are difficult or impossible to remove, with damaging the shelter or the structure to which it is attached.

Rather than transporting a preassembled shelter, or pouring a safe room on site, some manufacturers offer modular panels that can be retrofitted into an existing room or closet to create a safe room, without expensive construction. These shelters may be sold as kits that break down into panels and parts, allowing the shelter to be retrofitted into a room through hallways and passageways where other safe rooms could not be accommodated without demolition or construction. The panels are bolted together in the configuration desired for the particular space; however, even these modular shelters are bulky and difficult to dissemble and move, once installed. These shelters must be installed by a professional service company.

There exists a need for a storm shelter that is compact, lightweight, easily-installed, portable, and affordable, yet meets the safety levels of conventional storm shelters. The present invention provides all the protections required by Federal Emergency Management Agency (FEMA) P-320, FEMA-361, International Code Council (ICC)-500, National Performance Criteria for Tornado Shelters (NPCTS) standards, and the joint International Code Council and National Storm Shelter Association (NSSA) Standards for the Design and Construction of Storm Shelters. The present invention is designed to withstand winds in excess of 250 mph (400 km/h) due to tornadoes, hurricanes, straight line winds and other high wind weather events.

The present invention comprises a plurality of removable frames and a plurality of removable skins which are removably receivable on or within the removable frames and secured together by fasteners that do not have to be bolted in place, as do conventional storm shelters. The removable skins each comprise one or more removable fasteners, such as a hollow tube fastener comprising a hollow tube guide and a removeable pin receivable therethrough. The removable fasteners are configured on a surface of the removable skins to hold the removable skins in assembled configuration with the removable frames. No storm shelter on the market today can be effortlessly installed and dissembled using only removable fasteners to secure the components. The removable skins may be secured from the interior of the storm shelter, permitting the occupant of the shelter to remove the skins while within the interior safe space simply by removing the fasteners. The storm shelter also provides a door with exterior hinges that may be accessed and removed from the exterior of the shelter by rescue personnel.

Due to the multiple advantages of the invention, non-professionals and persons of smaller stature can assemble, install, deconstruct, transport and reassemble the shelter, all without employing construction skills and without damaging the structure in which the shelter is installed. The storm shelter is approximately the size of a garage workbench and can be sold as a kit and easily assembled by a purchaser with minimal construction skills. The shelter fits inconspicuously within an interior space, particularly a utilitarian space such as a garage, and functions as a workbench or other serviceable article when not in use as a storm shelter.

Figure 2:
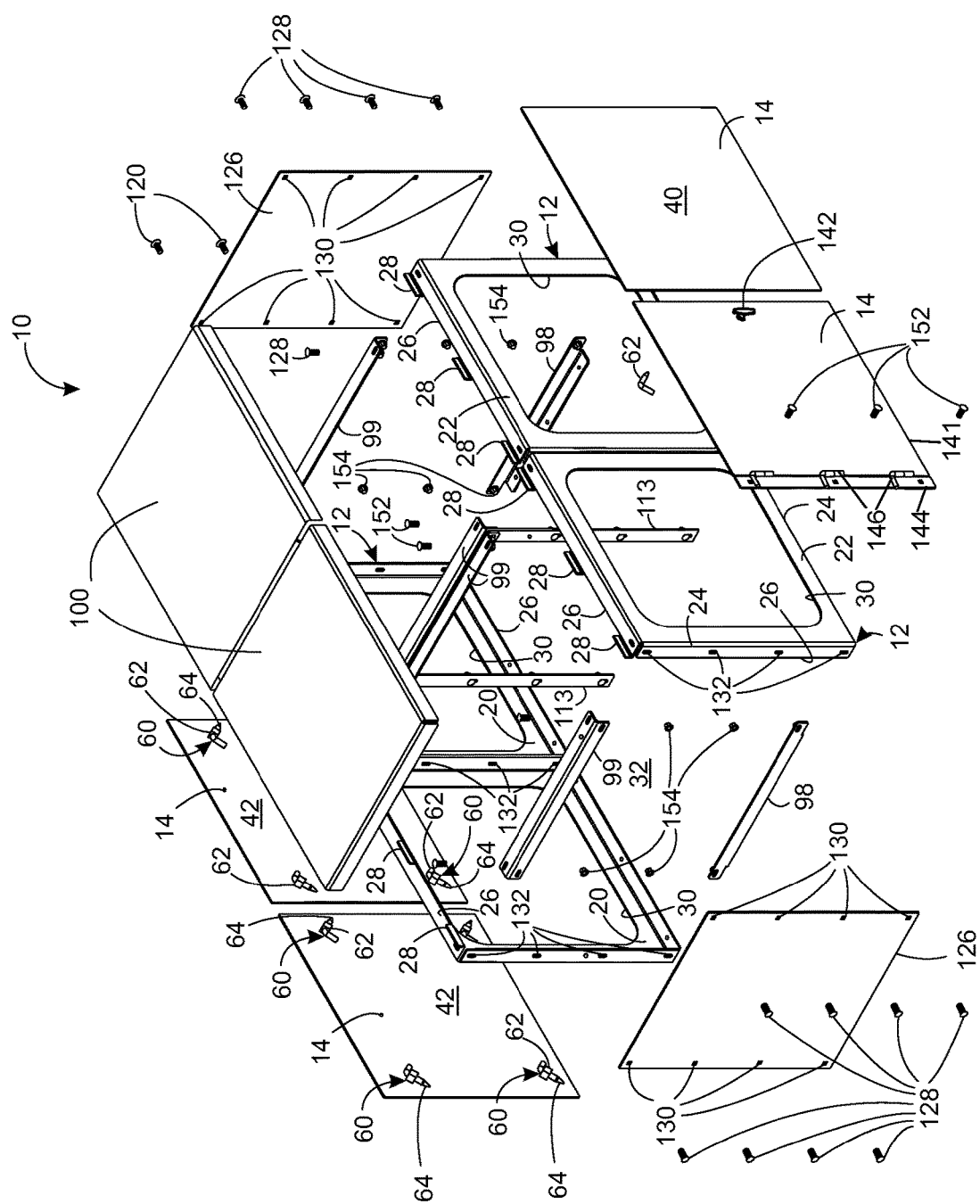
FIG. 2 is an exploded view of the storm shelter of FIG. 1.

Turning now to the drawings in general, and to FIGS. 1 and 2 in particular, there is shown therein an above-ground storm shelter 10, also referred to herein as a storm shelter, a shelter, a safe room or a unit. The storm shelter 10 comprises a plurality of removable frames 12 and a plurality of removable skins 14, wherein at least one of the plurality of removable frames is adapted to removably receive at least one of the plurality of removable skins.

The plurality of removable frames 12 has a configuration enabling at least one of the plurality of removable skins 14 to be received thereon or therein. The plurality of removable frames 12 may each form a unitary planar geometry having an interior planar surface 20, an exterior planar surface 22 and a perimeter 24 and may further comprise a flange 26 extending radially from the perimeter 24. The flange 26 extending from the perimeter 24 of the frame 12 is adapted to receive at least one of the plurality of skins 14 and, when in assembled configuration, contributes toward holding the at least one of the plurality of skins 14 in removable engagement with one of the plurality of frames 12 for creating an interior safe space 32. The flange 26 may further comprise one or more détente devices 28 for a purpose yet to be described.

Figure 3B:
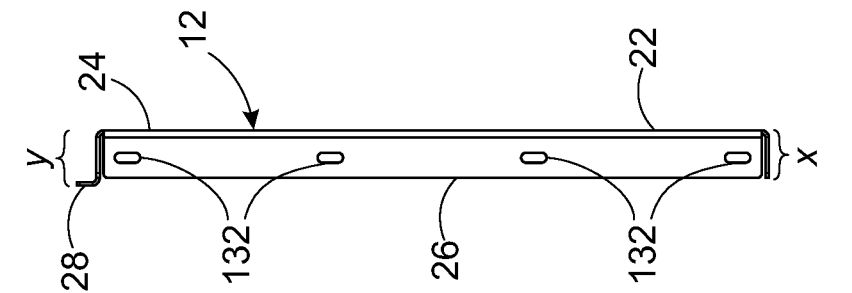
FIG. 3B is a side view of the illustrative removable frame of FIG. 3A.
Figure 3A:
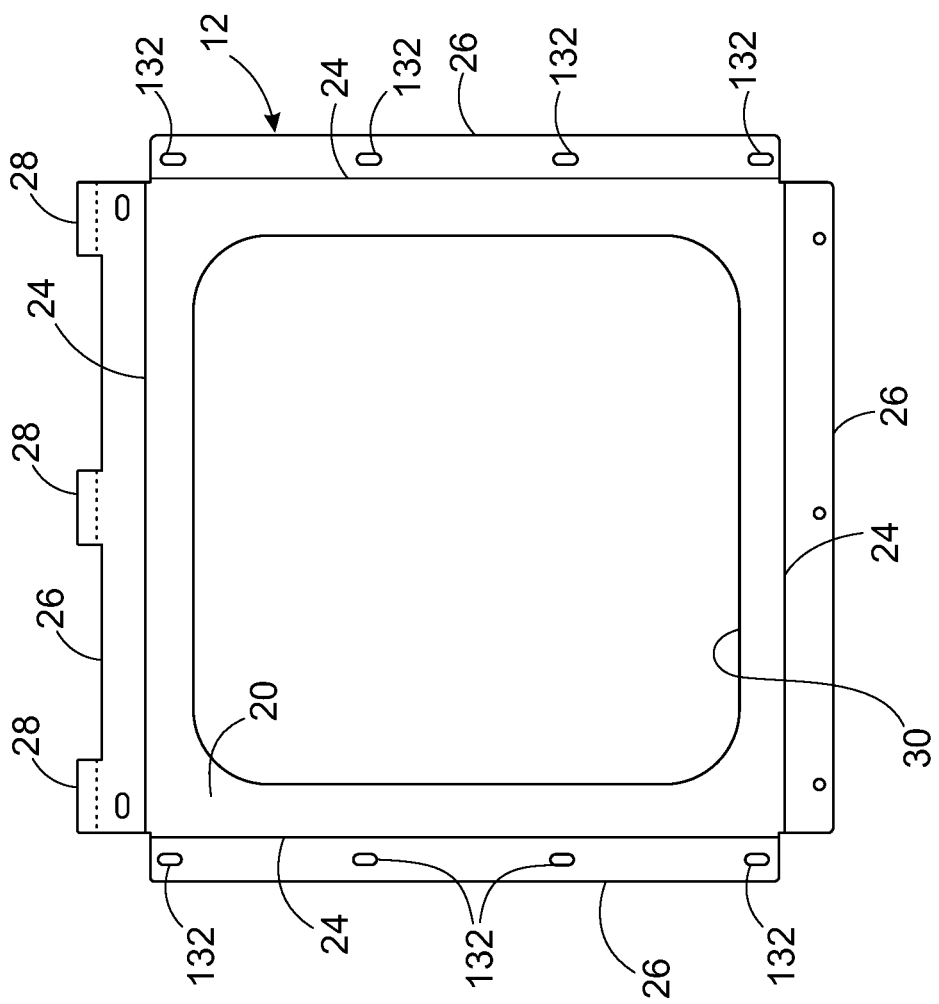
FIG. 3A is a plan view of an illustrative removable frame of the present invention.

In one embodiment of the invention, as shown in FIGS. 3A and 3B, the unitary planar geometry of the plurality of removable frames 12 comprises a square or a rectangle and further forms an aperture 30 therein for permitting ingress and egress to and from the interior safe space 32 of the shelter 10 in a manner yet to be described. The aperture 30 is positioned substantially centrally through the interior planar surface 20 and the exterior planar surface 22 of at least one of the plurality of removable frames 12. The aperture 30 may be any size or shape that permits an occupant to ingress or egress the interior safe space 32 of the storm shelter 10. In one embodiment of the invention, the aperture 30 ranges in diameter or width from about 18 inches (45.72 cm) to about 32 inches (81.28 cm). References herein to diameters and dimensions are to inside diameters and inside dimensions, unless specifically stated to reference an outer diameter or outside dimension. It will be appreciated, however, that the aperture 30 may be any diameter, or length, width, or other dimension, suited for the application and the conditions at the site where in use.

The dimensions of the plurality of frames 12 are variable. In one embodiment of the invention, the each of the plurality of frames 12 have a width, a height and a thickness. The width of the plurality of frames 12, prior to breaking for assembled configuration, may range from about 24 inches (60.96 cm) to about 144 inches (365.76 cm). The height of the plurality of frames 12, prior to breaking for assembled configuration, may range from about 24 inches (60.96 cm) to about 96 inches (243.84 cm). The thickness of the plurality of frames 12, prior to breaking for assembled configuration, may range from about 0.125 inches (0.3175 cm) to about 1 inch (2.54 cm). As used herein, breaking means forming or folding a component to its desired shape. In one embodiment of the invention, the plurality of frames 12, prior to breaking for assembled configuration, each has a width of approximately 40.38 inches (102.57 cm), a height of approximately 40.64 inches (103.23 cm), and a thickness of approximately 0.1875 inches (0.48 cm).

The width of the plurality of frames 12, after breaking for assembled configuration, may range from about 19 inches (48.26 cm) to about 139 inches (353.06 cm). The height of the plurality of frames 12, after breaking for assembled configuration, may range from about 19 inches (48.26 cm) to about 90.24 inches (229.21 cm). The thickness of the plurality of frames 12, after breaking for assembled configuration, may range from about 0.125 inches (0.3175 cm) to about 1 inch (2.54 cm). In one embodiment of the invention, the plurality of frames 12, after breaking for assembled configuration, have a width of approximately 35.38 inches (88.87 cm), a height of approximately 35 inches (88.9 cm), and a thickness x of approximately 2.5 inches (6.35 cm) including the flange 26, and a thickness y of approximately 2.88 inches (7.32 cm) including both the flange 26 and the détente device 28, as shown in FIG. 3B.

The flange 26 extending from the perimeter 24 of the frame 12 is adapted to receive at least one of the plurality of skins 14 and, when in assembled configuration, contributes toward holding the at least one of the plurality of skins 14 in removable engagement with one of the plurality of frames 12 for creating an interior safe space 32. To that end, the flange 26 extends radially from the perimeter 24 of the frame 12 at an angle of about 80 to 110 degrees with respect to the exterior planar surface 22 of the frame 12. In one embodiment of the invention, the flange 26 extends radially from the perimeter 24 of the frame 12 at an angle of about 90 degrees with respect to the exterior planar surface 11 of the frame 12. The flange 26 may extend radially distance of about 2 inches (5.08 cm) to about 4 inches (10.16 cm) from the perimeter 24 of the frame 12.

The number of frames 12 comprising the plurality of frames and their dimensions are calculated to achieve the desired size of the storm shelter 10. In one embodiment of the invention, the storm shelter 10 is approximately the size of a typical garage work bench and fits inconspicuously into smaller spaces. The storm shelter 10 may range in size from about 24 inches (60.96 cm) to about 144 inches (365.76 cm) in length, about 24 inches (60.96 cm) to about 96 inches (243.84 cm) in width, and about 24 inches (60.96 cm) to about 96 inches (243.84 cm) in height.

Turning now to FIGS. 4A, 4B, 4C, 4D, and 4E, but with continuing reference to FIGS. 1 and 2, the plurality of skins 14 is defined herein as components having a flat or curved geometry, or a combination of flat and curved geometries, and that form or are set onto or into the plurality of frames 12 of the shelter 10 to form a door, a wall, or a ceiling of the shelter. The plurality of skins 14 is adapted to be removably received by at least one of the plurality of removable frames 12. Each of the plurality of skins 14 may have a unitary planar geometry forming an exterior planar surface 40 and an interior planar surface 42. When in assembled configuration, the exterior planar surface 40 of at least one of the plurality of skins 14 is situated adjacent to or in substantially parallel configuration with the interior planar surface 20 of at least one of the plurality of removable frames 12 and anteriorly to the flange 26. It now will be appreciated that the flange 26 extending from the perimeter 24 of the frame 12 receives at least one of the plurality of skins 14 and, when in assembled configuration, contributes toward holding at least one of the plurality of skins 14 in removable engagement with one of the plurality of frames 12 for creating an interior safe space 32.

The dimensions of the plurality of skins 14 are variable. In one embodiment of the invention, the plurality of skins 14 each form a rectangle have a width, a height and a thickness. The width of the plurality of skins 14 may range from about 19 inches (48.26 cm) to about 139 inches (353.06 cm). The height of the plurality of skins 14 may range from about 19 inches (48.26 cm) to about 90.24 inches (229.21 cm). The thickness of the plurality of skins 14 may range from about 0.125 inches (0.3175 cm) to about 1 inch (2.54 cm). In another embodiment of the invention, the plurality of skins 14 have a width of approximately 34 inches (86.36 cm), a height of approximately 31.5 inches (80.01 cm), and a thickness of approximately 0.1875 inches (0.48 cm).

Figure 4B:
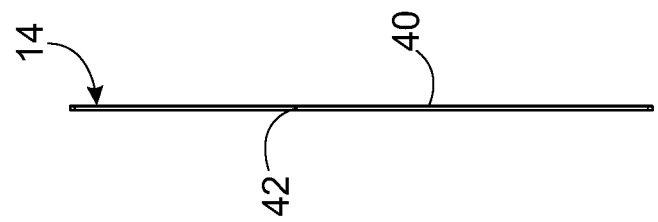
FIG. 4B is a side view of the illustrative removable skin of FIG. 4A.
Figure 4A:
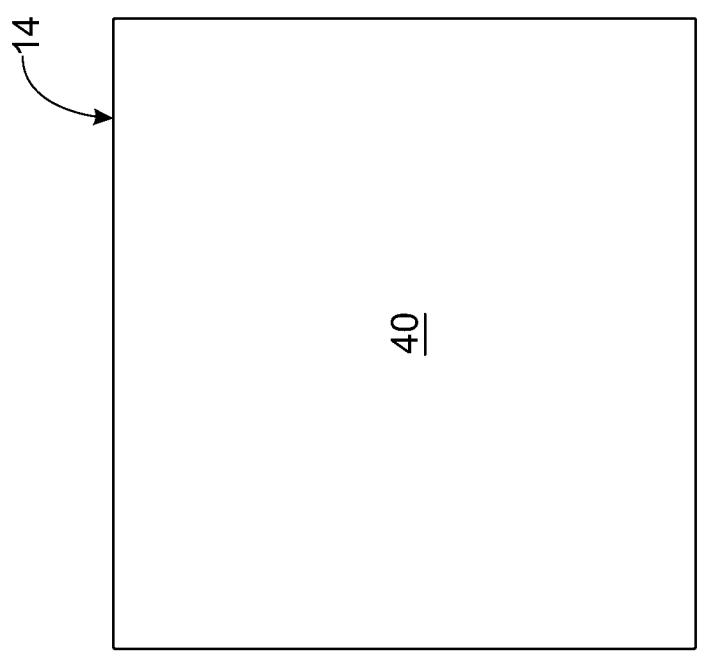
FIG. 4A is a plan view of an exterior planar surface of an illustrative removable skin of the present invention.
Figure 4E:
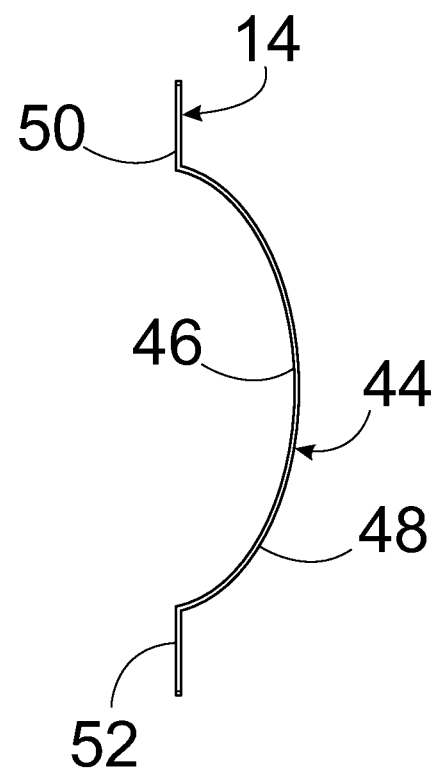
FIG. 4E is a side view of an illustrative alternative removable skin of the present invention.

It will be appreciated that the plurality of skins 14 may form a generally uniform planar geometry, both exteriorly and interiorly, or may form a geometry comprising a combination of both planar and curved components. As shown in FIG. 4E, the interior surface of at least one of the plurality of skins 14 may further form a curved portion 44 comprising an interior concave surface 46, while the exterior surface of at least one of the plurality of skins 14 may form an exterior convex surface 48. An upper portion 50 and a lower portion 52 of the at least one of the plurality of skins 14 is situated adjacent to or in contact with the interior planar surface 20 of the at least one of the plurality of removable frames 12 and anteriorly to the flange 26 thereof. The upper portion 50 and the lower portion 52 may abut or substantially parallel a portion of the interior planar surface 20 of the at least one of the plurality of frames 12, while the interior concave surface 46 and the exterior convex surface 48 of the at least one of the plurality of skins 14 extend through the aperture 30 of the at least one of the plurality of frames 12, thereby creating an enlarged interior safe space 32 without occupying a larger overall footprint for the safe room 10 within a building or other structure. It will be appreciated that the curved portion 44 may be of equal thickness to the respective thicknesses of the upper portion 50 and the lower portion 52 of the at least one of the plurality of skins 14, or that the thickness of the curved portion 44 may be greater or lesser than the respective thicknesses of the upper portion 50 and the lower portion 52. For example, in one embodiment of the invention, the curved portion 44 may comprise a greater thickness than the respective thicknesses of the upper portion 50 and the lower portion 52 to provide increased strength and protection against flying debris.

The plurality of removable skins 14 further comprises a removable fastener 60 that does not have to be bolted in place and that can be easily fastened and unfastened during an emergency event. In one embodiment of the invention, the removeable fastener 60 comprises a hollow tube fastener, comprising a guide 62 and a removeable pin 64 receivable therethrough, wherein the hollow tube fastener 60 is configured on the interior planar surface 42 of at least one of the plurality of removable skins 14 to hold the at least one of the plurality of removable skins in assembled configuration with at least one of the plurality of frames 12. More particularly, the hollow tube fastener 60 removably holds the exterior planar surface 40 of at least one of the plurality of skins 14 in cooperative engagement with the interior planar surface 20 of at least one of the plurality of frames 12. The exterior planar surface 40 of at least one of the plurality of skins 14 may be held flush against the interior planar surface 20 of at least one of the plurality of frames 12 by the hollow tube fastener 60 or may leave some space therebetween.

Figure 4F:
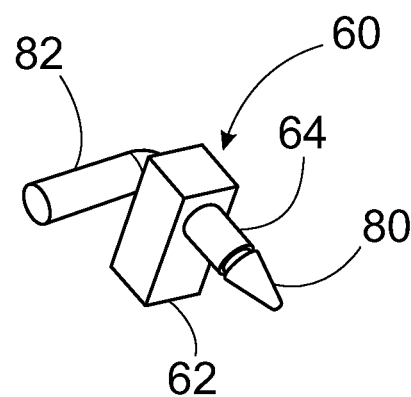
FIG. 4F shown an illustrative removable fastener suitable for use with the present invention.

As shown in FIG. 4F, the guide 62 of the hollow tube fastener 60 is secured to the removable skin 14 via welding or other securing means. The guide 62 of the hollow tube fastener comprises a bore (not shown) through which the pin 64 is inserted to removably hold one of the plurality of skins 14 in operational engagement with one of the plurality frames 14. The guide 62 may comprise a steel block structure, a cube, a cylinder or a prism, having a central aperture (not shown) bored therethrough for receiving the pin 64. The pin 64 may comprise a shaft portion 80 for insertion through the bore in the guide 62 and a handle 82 for manipulating the shaft portion 80 of the pin 64. The guide 62 is approximately a one inch (2.54 cm) to 1.25 inch (3.175 cm) cube or rectangular prism with a height of approximately 1.5 inches (3.81 cm) but may be any shape and size adapted to receive the pin 64. The shaft portion 80 of the pin 64 may be chamfered to facilitate entry into the guide 62. The shaft portion 80 ranges in length from about 3 inches (7.62 cm) to about 8 inches (20.32 cm) and in diameter from about 1 inch (2.54 cm) to about 3 inches (7.62 cm). In one embodiment of the invention, the shaft portion 80 measures about 0.625 (1.588 cm) inches in diameter and is about 6.5 inches (16.52 cm) in length. Alternative fasteners 60 may be employed in the invention as long as they hold the plurality of removable skins 14 in assembled configuration with the plurality of removable frames 12 during a whether event. Examples of alternative fasteners 60 include hook and eye latches, gate hooks, gate pins and padlocks. The pin 64 is removable by an occupant from the interior safe space 32, thereby giving the occupant freedom to leave the storm shelter 10 through an aperture 30 after removing one of the plurality of skins 14 after an emergency event.

It will be appreciated that number of fasteners 60 and the location and angle of the fasteners 60 will vary with respect to geometries and the dimensions of the plurality of frames 12 and the plurality of skins 14. In one embodiment of the invention, four hollow tube fasteners 60 are configured on the interior planar surface 42 of one of the plurality of skins 14 at a 45-degree angle z with respect the vertical orientation of the skin 14, as illustrated in FIG. 4C. When the geometry of the plurality of skins 14 comprises a square or a rectangle, each hollow tube fastener 60 is positioned proximal one of the four corners of the skin 14. A first hollow tube fastener 60 is positioned approximately 3.125 inches (7.94 cm) from the base edge 70 and approximately 3.125 inches (7.94 cm) from the left edge 72 of the skin 14. A second hollow tube fastener 60 is positioned approximately 3.125 inches (7.94 cm) from the base edge 70 and approximately 3.125 inches (7.94 cm) from the right edge 74 of the skin 14. A third hollow tube fastener 60 is positioned approximately 2.5 inches (6.35 cm) from the top edge 78 and approximately 5.0 inches (12.7 cm) from the left edge 72 of the skin 14. A fourth hollow tube fastener 60 is positioned approximately 2.5 inches (6.35 cm) from the top edge 78 and approximately 5.0 inches (12.7 cm) from the right edge 74 of the skin 14. It will be appreciated that the fasteners 60 may be configured anywhere on a skin 14 as long as the fastener 60 is engaging with the flange 26 of a frame 12. For example, in one embodiment of the invention, multiple fasteners 60 could be situation along the top edge 78 and/or the bottom edge 70 of the skin 14.

The overall shape and size of the storm shelter 10 will in part determine the number comprising the plurality of frames 12 and the plurality of skins 14. In one embodiment of the invention, the storm shelter 10 forms a rectangular prism having two opposing sides 90 and 92, each having a length, and two opposing ends 94 and 96, each having a length, wherein the length of the two opposing sides is longer than the length of the two opposing ends and wherein the number of the plurality of frames 12 equals four and the plurality of frames are configured to form the opposing sides 90 and 92 of the shelter. The two opposing sides 90 and 92 may be connected by a plurality of connectors, such lower angle irons 98 and upper angle irons 99, as illustrated in FIG. 2.

Turning now to FIGS. 5A, 5B, 5C, 5D, 5E and 5F, but with continuing reference to FIGS. 1 through 4F, the storm shelter 10 may further comprising one or more removable roof skins 100. The roof skins 100 comprise a generally unitary planar geometry having an interior planar surface 102, an exterior planar surface 104 and a perimeter 106, and may further comprise a roof flange 108 extending radially from the perimeter 106. The roof flange 108 extending from the perimeter 106 of the roof skin 100 is adapted to be positioned over the flange 26 of least one of the plurality of frames 12, as illustrated in FIG. 2. The roof flange 108 forms an apron flanking the shelter 10 on at least three sides of the unit 10.

The roof flange 108 extending from the perimeter 106 of the roof skin 100 is adapted to be positioned over the flange 26 of least one of the plurality of frames 12. To that end, the roof flange 108 extends radially from the perimeter 106 of the roof skin 100 at an angle of about 90 to about 135 degrees with respect to the exterior planar surface 104 of the roof skin. In one embodiment of the invention, the roof flange 108 extends radially from the perimeter 106 of the roof skin 100 at an angle of about 90 degrees with respect to the exterior planar surface 104 of the roof skin.

It now will be appreciated that the détente device 28 of the plurality of frames 12 supports the roof skin 100 off of the frame 12. When in assembled configuration, the roof skin 100 rests on the détente device 28 and is supported approximately one inch (2.54 cm) above the flange 26 of the at least one of the plurality of frames 12, creating a gap therebetween around the entire perimeter of the shelter 10, and thus allowing sound, light, daylight and fresh air to pass therethrough, alleviating fears of darkness or claustrophobia while securing occupants within the interior safe space 32 from wind, rain and debris.

When more than one roof skin 100 comprises the storm shelter 10, one or more spacers 113 may be employed between respective frames 12 comprising opposing sides 90 and 92. As shown in FIG. 2, at least one spacer 113 is configured vertically between the plurality of frames 12 to provide space between adjacent roof skins 100 and ease the installation of the roof skins during assembly and removal of roof skins during disassembly.

Figure 5A:
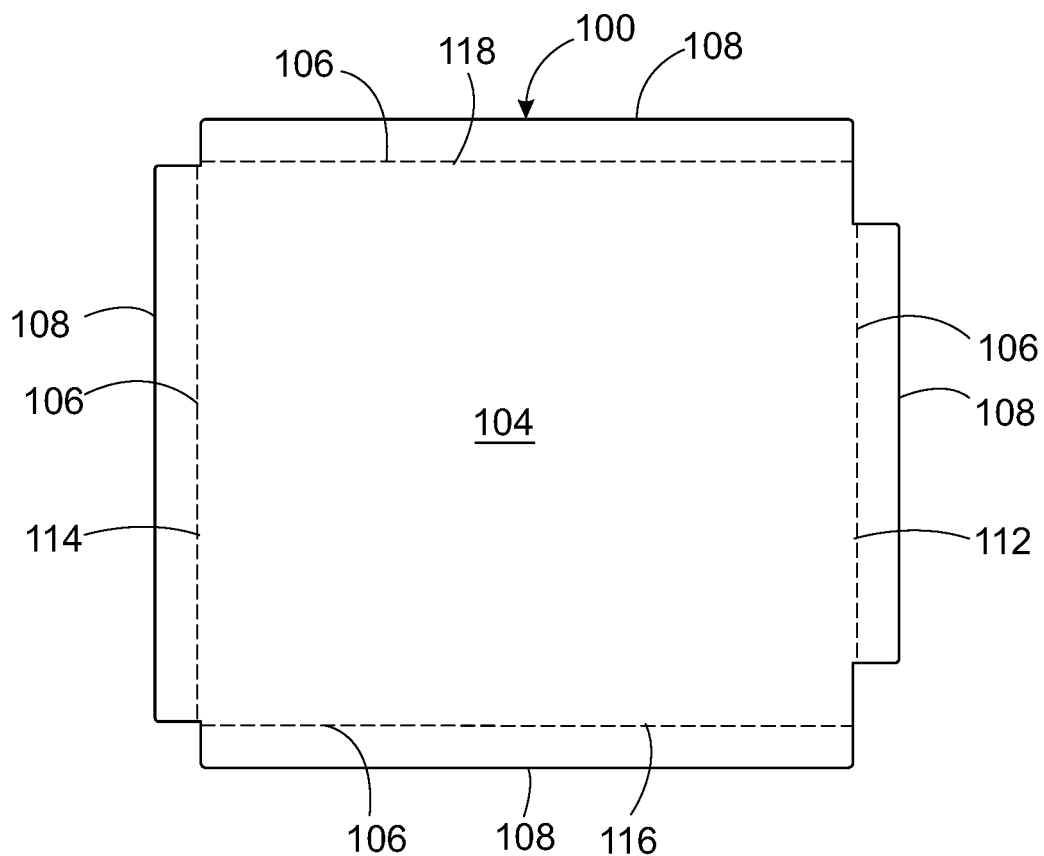
FIG. 5A is a plan view of an exterior planar surface of an illustrative removable roof skin of the present invention, prior to being broken for assembly.
Figure 5B:
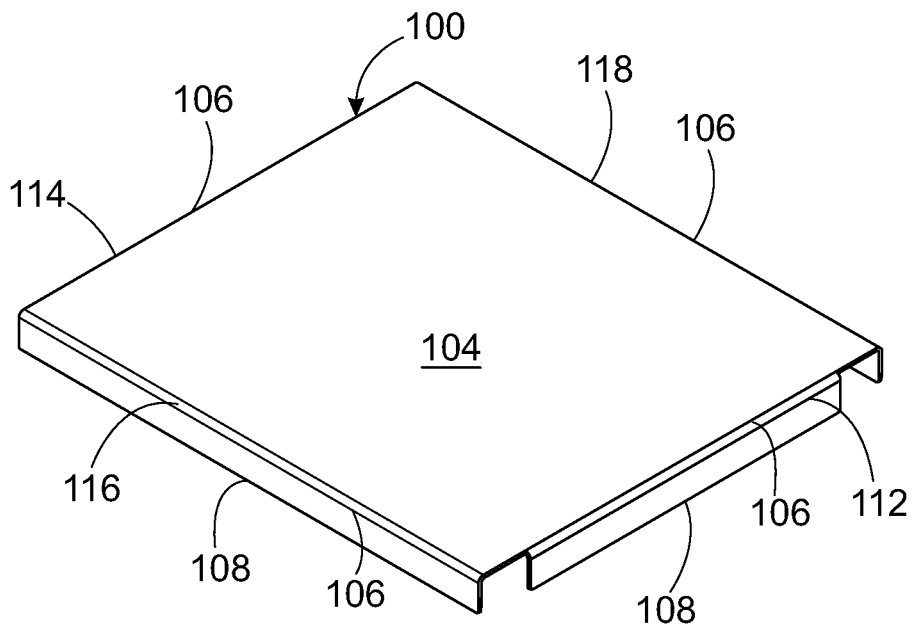
FIG. 5B is a perspective view of an exterior planar surface of the illustrative removable roof skin of FIG. 5A, after being broken for assembly.
Figure 5C:
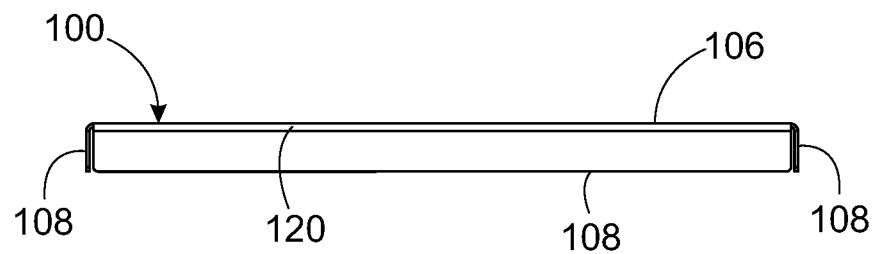
FIG. 5C is a side view of the outer edge of the roof flange of the illustrative roof skin of FIG. 5A, after being broken for assembly.
Figure 5D:
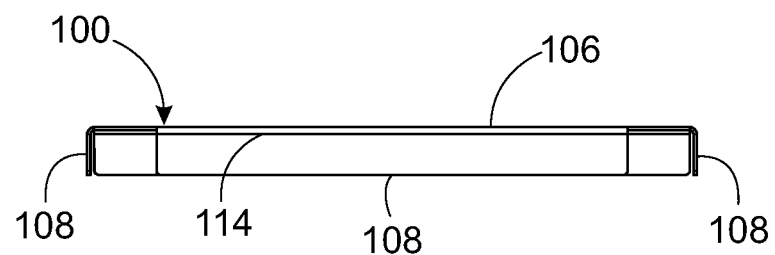
FIG. 5D is a side view of the inner edge of the roof flange of the illustrative roof skin of FIG. 5A, after the being broken for assembly.
Figure 5E:
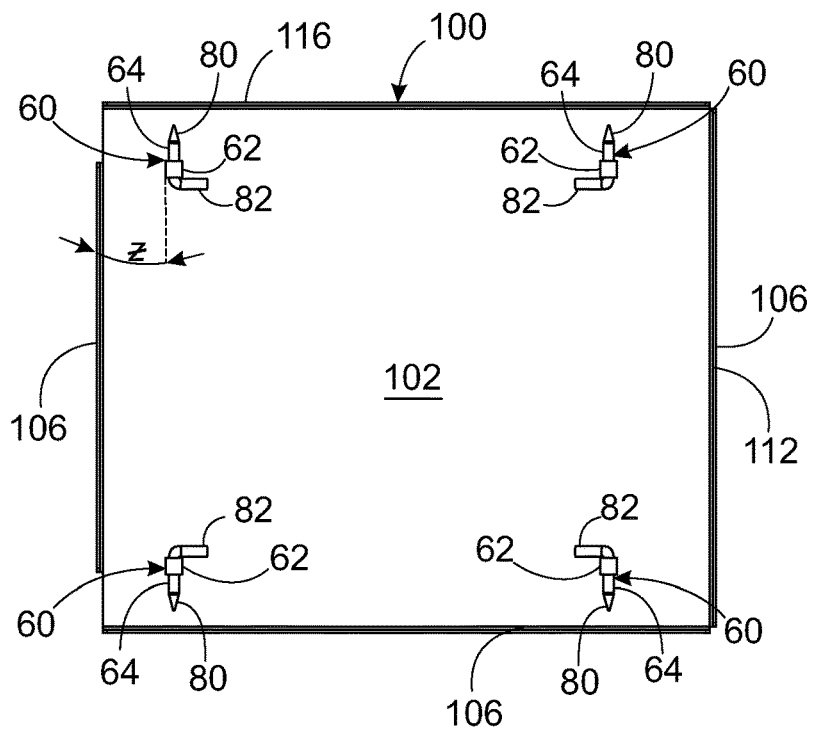
FIG. 5E is a plan view of an interior planar surface of an illustrative removable roof skin of the present invention, after being broken for assembly.
Figure 5F:
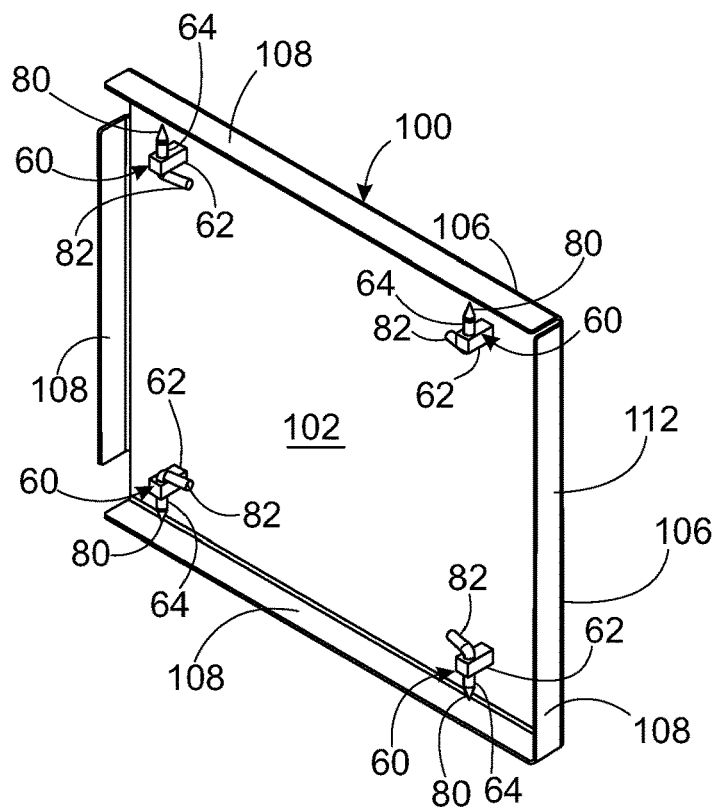
FIG. 5F is a perspective view of the interior planar surface of the illustrative removable roof skin of FIG. 5E.

With continuing reference to FIGS. 5E and 5F, the plurality of roof skins 100 may further comprise a second set of one or more removable fasteners 60 that can be easily fastened and unfastened during an emergency event. In one embodiment of the invention, the removeable fastener 60 comprises a hollow tube fastener similar to the hollow tube fastener employed in conjunction with plurality of skins 12, comprising a guide 62 and a removeable pin 64 receivable therethrough. The hollow tube fastener 60 is configured on the interior planar surface 102 of at least one of the plurality of removable roof skins 100 to hold the at least one of the plurality of removable skins in assembled configuration with at least one of the plurality of frames 12. More particularly, the hollow tube fastener 60 removably holds the roof flange 108 of at least one of the plurality of roof skins 100 in cooperative engagement with the flange 26 of at least one of the plurality of frames 12. The roof flange 108 of at least one of the plurality of skins 14 may be held flush against the flange 26 of at least one of the plurality of frames 12 by the hollow tube fastener 60 or may leave some space therebetween.

It will be appreciated that number of fasteners 60 and the location and angles of the fasteners 60 will vary with respect to the geometries and the dimensions of the plurality of roof skins 100 and the plurality of frames 12. In one embodiment of the invention, four hollow tube fasteners 60 are configured on the interior planar surface 102 of one of the plurality of roof skins 100 at a 90-degree angle r with respect to the vertical orientation of the skin 14, as illustrated in FIG. 5E, wherein the roof skin 100 has an outer edge 112, and inner edge 114, a front edge 116 and a back edge 118. The inner edge 112, outer edge 114, front edge 116 and back 118 may be beveled as shown in FIGS. 5B and 5E. When the geometry of the plurality of roof skins 100 comprises a square or a rectangle, each hollow tube fastener 60 is positioned proximal one of the four corners of the roof skin 100. With respect to the roof skin 100, the guides 64 of the hollow tube fasteners 60 may be positioned approximately 4.125 inches (10.48 cm) from the front edge 116 and the back edge 118, respectively. The guides 64 of the hollow tube fasteners 60 proximal the inner edge 112 may be positioned approximately 3.5 inches (8.89 cm) therefrom, and the hollow tube fasteners 60 proximal the outer edge 114 are positioned approximately 4.125 inches (10.79 cm) therefrom.

It will be appreciated that the hollow tube fasteners 60 may be positioned in a variety of locations to hold the components of the storm shelter 10 in operative engagement. By way of example, multiple guides 64 may be employed in sequential arrangement for receiving a pin 64 of additional length. For extra strength and stability, one guide 64 may be positioned on flange 26 of the frame 12, while a second guide 64 may be positioned on a roof skin 100 such that, when the roof skin 100 is in assembled configuration with the frame 12, the guides 64 align sequentially to receive a pin 64 simultaneously through both guides, thereby providing additional strength and stability to the shelter 10. As an additional example, five pairs of double guides 62 with pins 64 per roof skin 100, positioned proximal the outer edge 114, front edge 116 and back edge 118, could be employed. Additionally, the fastener 60 may further comprise an adaptor 120 to adapt the guide 62 to non-planar surfaces. It will be appreciated that the fasteners 60 may be configured anywhere on a roof skin 100 as long as the fastener 60 is engaging the flange 26 of a frame 12 to hold the roof skin and the frame 12 in assembled configuration.

The dimensions of the plurality of roof skins 100 are variable. In one embodiment of the invention, the each of the plurality of roof skins have a width, a length and a thickness. The width of the plurality of roof skins 100, prior to breaking for assembled configuration, may range from about 24 inches (60.96 cm) to about 144 inches (365.76 cm). The length of the plurality of frames 12, prior to breaking for assembled configuration, may range from about 24 inches (60.96 cm) to about 96 inches (243.84 cm). The thickness of the plurality of frames 12, prior to breaking for assembled configuration, may range from about 0.125 inches (0.3175 cm) to about 1 inch (2.54 cm). In one embodiment of the invention, the plurality of roof skins, prior to breaking for assembled configuration, each has a length of approximately 41.45 inches (102.57 cm) as measured along the front edge 116 and the back edge 118, a width of approximately 36.13 inches (91.77 cm) as measured along the outer edge 112, a width of approximately 24.50 inches (62.23 cm) as measured along the inner edge 114, and a thickness of approximately 0.1875 inches (0.48 cm).

The width of the plurality of roof skins 100, after breaking for assembled configuration, may range from about 24 inches (60.96 cm) to about 144 inches (365.76 cm). The length of the plurality of frames 12, prior to breaking for assembled configuration, may range from about 24 inches (60.96 cm) to about 96 inches (243.84 cm). The thickness of the plurality of frames 12, prior to breaking for assembled configuration, may range from about 0.125 inches (0.3175 cm) to about 1 inch (2.54 cm). In one embodiment of the invention, the plurality of roof skins 100, prior to breaking for assembled configuration, each has a length of approximately 37.125 inches (94.30 cm) as measured along the front edge 116 and the back edge 118, a width of approximately 34.25 inches (86.99 cm) as measured along the outer edge 112, a width of approximately 34.27.25 inches (69.22 cm) as measured along the inner edge 114, and a thickness of approximately 0.1875 inches (0.48 cm).

Figures 6A, 6B:
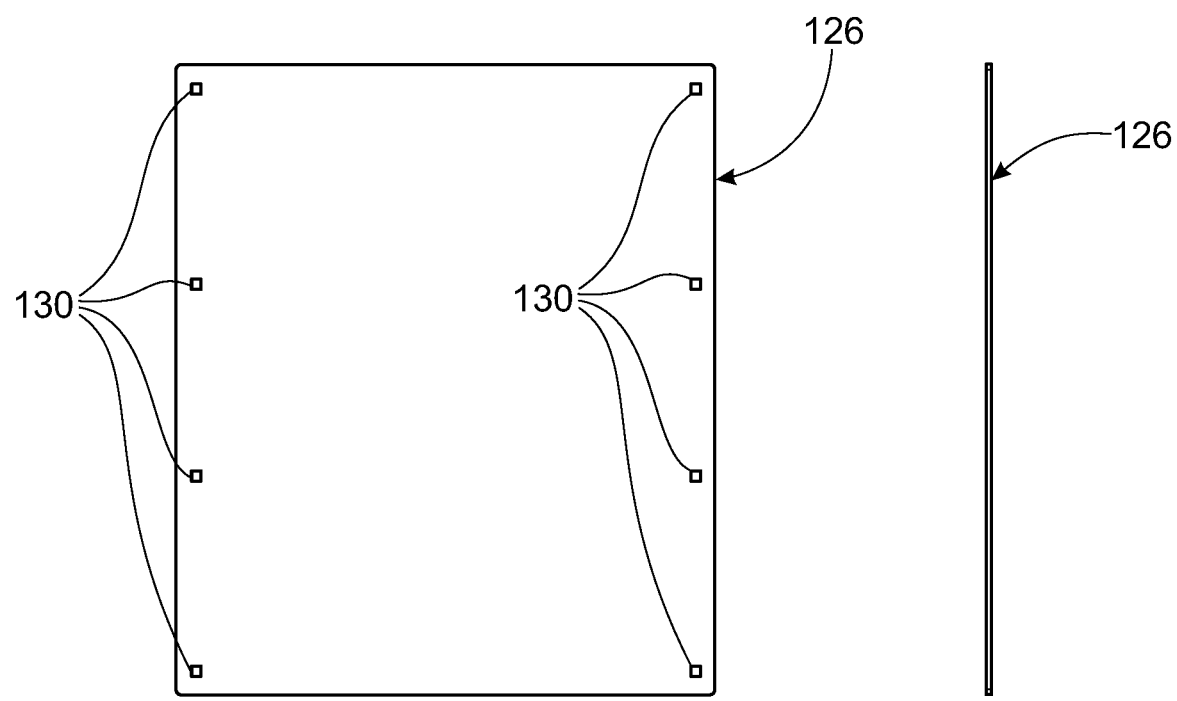
FIG. 6A is a plan view of an illustrative end skin of the present invention.
FIG. 6B is a side view of the illustrative end skin of FIG. 6A.
Figures 7C, 7D:
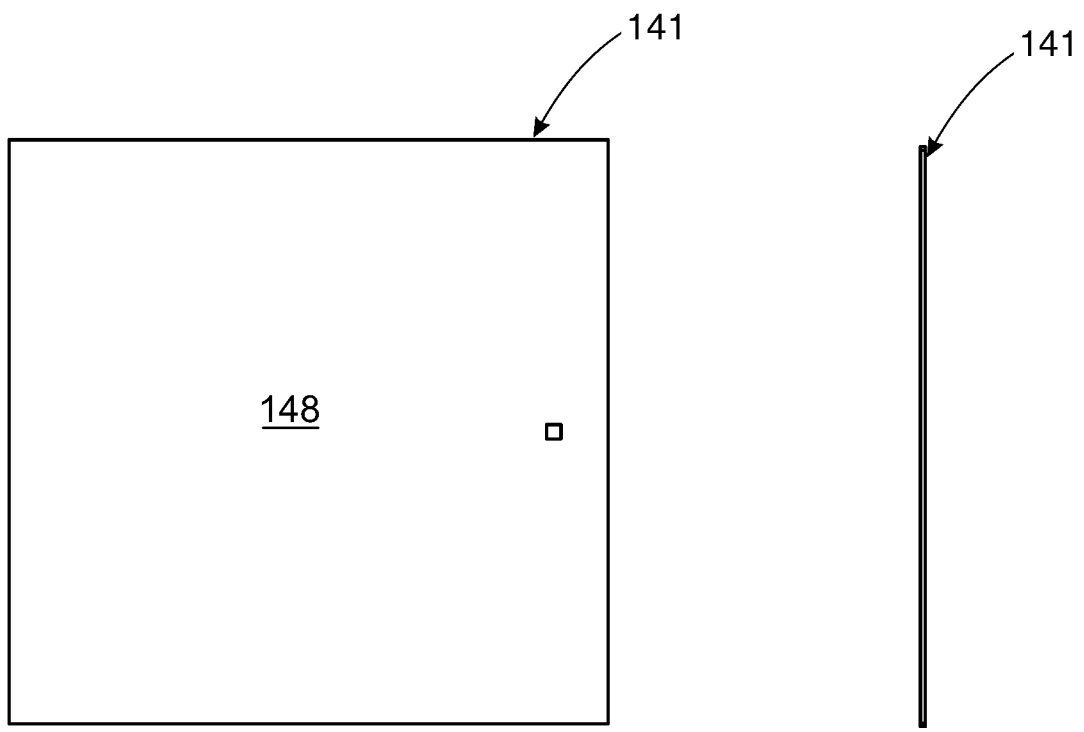
FIG. 7C a plan view of a door skin comprising the illustrative door of FIG. 7A.
FIG. 7D is a side view of the illustrative door skin of FIG. 7C.

Turning now to FIGS. 6A and 6B, the storm shelter 10 may further comprise one or more removable end skins 126 removably receivable at each of the opposing ends 94 and 96 of the shelter to completely enclose the shelter and create the interior safe space 32. The end skins 126 connect with lower angle irons 98 and upper angle irons 99, as illustrated in FIG. 2, with screws or connectors 128 receivable in apertures 130, which mate with apertures 132 formed in the flange 26 of the plurality of frames 12.

The dimensions of the end skins 126 are variable. In one embodiment of the invention, the number of end skins 126 is two, one of which is received at end 94 and the other which is received at end 96, and each forms a rectangle having a width, a height and a thickness. The width of the end skin 126 may range from about 19 inches (48.26 cm) to about 139 inches (353.06 cm). The height of the end skin 126 may range from about 19 inches (48.26 cm) to about 90.24 inches (229.21 cm). The thickness of the end skin 126 may range from about 0.125 inches (0.3175 cm) to about 1 inch (2.54 cm). In another embodiment of the invention, the end skins 126 have a width of approximately 29 inches (73.66 cm), a height of approximately 34 inches (86.36 cm), and a thickness of approximately 0.19 inches (0.48 cm).

Turning now to FIGS. 7A, 7B, 7C and 7D, the storm shelter may further comprise a door 140. In one embodiment of the invention, one of the plurality of skins 14 may comprise or be replaced by a door 140, offering formal ingress and egress to the storm shelter 10. In the event that the door 140 is blocked after a weather event, an occupant of the interior safe space 32 may exit the shelter 10 by removing the pins 64 held within the hollow tube fasteners 60 positioned proximal the plurality of skins 14 or of one or more roof skins 126. However, a formal door 140 may offer greater ease and convenience when entering and exiting the storm shelter 10, if unblocked by debris. The location of the door 140 is variable, depending upon the conditions and configuration in the location where the shelter 10 is installed. In one embodiment of the invention, the door 140 replaces one of the plurality of skins 14 situated on opposing side 90 of the storm shelter 10. The door 140 may be installed for either left or right-side application, depending upon the desired configuration and conditions at the locale where installed.

The door 140 comprises a door skin 141, a door handle 142, a hinge strip 144, hinges 146, an interior surface 148 and an exterior surface 150. Miscellaneous screws 152 and nuts 154 may be employed with the door 140 and as needed throughout the unit 10. The door 140 may further comprise removeable fasteners 60 on the interior surface 148 of the door to supplementarily secure the door 140 from within the interior safe space 32. Guides 62 shown in FIG. 7A represent illustrative placement of the removable fasteners 60 on the door 140, so that pins 64 (not shown in FIG. 7A) engage with one or more of the plurality of frames 12. Once inside the interior safe space 32, the occupant fastens the door 140 shut from the inside by inserting pins 64 (not shown in FIG. 7A) through the guides 62.

The hinges 146 of the door may comprises pins 64 receivable in the hinges 146 on the exterior surface 150 of the hinge strip 144, enabling rescue personnel to quickly and easily remove the door 140 by simply removing the external hinge pins 64 on the hinge strip. This feature is particularly desirable if occupants inside the shelter are unconscious or are unable to remove the pins 64 from the hollow tube fasteners 60 situated on the interior surface 148 of the door 140, the roof skins 126 or the plurality of skins 14.

The dimensions of the door skin 141 are variable. In one embodiment of the invention, the door skin 141 forms a rectangle having a width, a height and a thickness. The width of the door skin 141 may range from about 19 inches (48.26 cm) to about 139 inches (353.06 cm). The height of the door skin 141 may range from about 19 inches (48.26 cm) to about 90.24 inches (229.21 cm). The thickness of the door skin 141 may range from about 0.125 inches (0.3175 cm) to about 1 inch (2.54 cm). In another embodiment of the invention, the door skin 141 has a width of approximately 32.50 inches (82.55 cm), a height of approximately 31.5 inches (80.01 cm), and a thickness of approximately 0.1875 inches (0.48 cm).

All components of the storm shelter 10 may made be of any material suitable for use in above ground storm shelters, including steel, rolled steel, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, ultra-high molecular weight polyethylene (UHMWPE), aramid, unidirection aramid, woven aramid, boron-carbon ceramic materials, carbon composite reinforced plastics and combinations of the foregoing. It will be appreciated that the components may be produced from other materials suited to the particular temperatures, pressures, fluids and other conditions for the application and the site where the storm shelter 10 is installed. In one embodiment of the invention, the components of the invention are made of rolled steel. When the plurality of frames 12 and the roof skins 100 are made of steel, they are broken, folded, bent or pre-welded to create a stamped shape, such as that shown in FIGS. 3A and 5C.

The invention further is directed to a removeable skin 14 for a storm shelter 10, the skin having a unitary planar geometry, either in whole or in part, forming an exterior planar surface 40, an exterior planar surface 42, and removeable fastener 60 that does not have to be bolted in place. The removable fastener 60 may comprise a hollow tube fastener having a guide 62 and a removeable pin 64 receivable therethrough, wherein the hollow tube fastener 60 is configured on the interior planar surface 42 of the removable skins to hold the removable skin in assembled configuration with a frame 12 of the shelter 10. The plurality of removable skins 14 further may be removably received within or on a plurality of removeable frames 12.

The method and operation of the invention will now be explained. The foregoing description of the invention is incorporated herein. The invention comprises a method of using a transportable storm shelter 10, the shelter having sides and forming an interior safe space 32. The method comprises the steps of providing a removable skin 14 to form a side of the shelter 10 and securing, from within the interior safe space 32, the removable skin to form a side of the shelter. The method may further comprise the step of securing, from within the interior safe space 32, the removeable skin 14 with a removable fastener 60. The method may further comprise the step of securing, from within the interior safe space 32, a removable roof skin 100. The method may further comprise the step of providing air and light into the interior safe space 32 underneath the removable roof skin 100. The method may further comprise the steps of entering the interior safe space 32 and securing, from within the interior safe space, a removable door 140 on a side of the storm shelter 10. The method may further comprise the steps of removing, from within the interior safe space 32, the removeable door skin 141 and exiting the interior safe space through the door of the shelter 10. The method may further comprise the steps removing, from outside of the interior safe space 32, the removeable door skin 141 and allowing occupants of the interior safe space to exit through the door 140 of the shelter. The method may further comprise the steps of removing, from within the interior safe space 32, the removeable fastener 60, removing, from within the interior safe space, the removable skin 14 forming a side of the shelter or the removeable end skin 126 forming an end of the shelter, and exiting the interior safe space through the side or the end of the shelter. The method may further comprise the steps of removing, from within the interior safe space 32, the removeable roof skin 100 and exiting the interior safe space through the roof of the shelter. The method may further comprise the steps of removing, from within the interior safe space 32, the removeable fastener 60, removing, from within the interior safe space, the removable skin 14 forming a side of the shelter 10, and transporting the shelter to another location.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A transportable storm shelter for providing shelter from tornadoes, hurricanes, straight line winds and high wind weather events, the transportable storm shelter forming an interior space and comprising:
   a plurality of removable frames, wherein each of the plurality of removable frames has in whole or in part a unitary planar geometry having an interior planar surface, an exterior planar surface and a perimeter and further comprises a flange extending radially from the perimeter;
   a plurality of removable skins, wherein each of the plurality of removable skins has an interior surface and is removably receivable on or within one of the plurality of removable frames;
   at least one removable fastener that is not bolted in place and is configured to hold at least one of the plurality of removable skins in assembled configuration with at least one of the plurality of removable frames, wherein the removable fastener is secured to the interior surface of the at least one of the plurality of removable skins; and the at least one of the plurality of removable skins is configured to be removed from the at least one of the plurality of removable frames from the interior space of the transportable storm shelter by release of the removable fastener; and
   at least one removable roof skin comprising a unitary planar geometry, in whole or in part, and having an interior planar surface, an exterior planar surface, a perimeter and a flange extending radially from the perimeter of the removable roof skin;
   wherein the transportable storm shelter forms a rectangular prism having two opposing sides, each having a length, and two opposing ends, each having a length; the length of the two opposing sides is longer than the length of the two opposing ends; and
      the plurality of removable frames is configured to form the opposing sides of the transportable storm shelter.

2. The transportable storm shelter of claim 1 wherein the unitary planar geometry of the plurality of removable frames comprises either a square or a rectangle.

3. The transportable storm shelter of claim 1 wherein each of the plurality of removable frames forms an aperture located substantially centrally through the interior planar surface and the exterior planar surface of each of the plurality of removable frames.

4. The transportable storm shelter of claim 1 wherein:
   each of the plurality of removable skins has a unitary planar geometry, in whole or in part, forming an interior planar surface and an exterior planar surface; and
   at least one of the plurality of removable skins is removably receivable within one of the plurality of removable frames such that the planar surface of the at least one of the plurality of removable skins is situated substantially parallel to the planar surface of one of the plurality of removable frames and anteriorly to the flange.

5. The transportable storm shelter of claim 4 wherein the removable fastener is a hollow tube fastener comprising a hollow tube guide and a removeable pin receivable therethrough, wherein the hollow tube fastener is secured on the interior planar surface of the at least one of the plurality of removable skins to hold the at least one of the plurality of removable skins in assembled configuration within at least one of the plurality of frames.

6. The transportable storm shelter of claim 5 wherein the hollow tube fastener is situated at an angle with respect to the interior planar surface of the at least one of the plurality of removable skins.

7. The transportable storm shelter of claim 1 wherein the at least one removable roof skin is positioned atop one or more of the plurality of removable frames that are configured along each of the opposing sides of the transportable storm shelter and the flange of the at least one removable roof skin forms an apron flanking the transportable storm shelter.

8. The transportable storm shelter of claim 7 further comprising a roof hollow tube fastener, the roof hollow tube fastener comprising a hollow tube and a pin receivable therethrough.

9. The transportable storm shelter of claim 8 wherein the roof hollow tube fastener is positioned on the interior planar surface of the at least one removable roof skin to hold the at least one removable roof skin in assembled configuration with the flange of at least one of the plurality of removable frames.

10. The transportable storm shelter of claim 7 wherein the at least one removable roof skin, when in assembled configuration with the at least one of the plurality of removable frames, is supported a distance above the plurality of removable frames, permitting light and air to pass under the apron of the at least one removable roof skin.

11. The transportable storm shelter of claim 1 further comprising a removable end skin removably receivable at each of the opposing ends of the transportable storm shelter.

12. The transportable storm shelter of claim 4 wherein one of the plurality of removable skins comprises a removeable door to the transportable storm shelter.

13. The transportable storm shelter of claim 12 wherein the one of the plurality of removable skins comprising the removable door further comprises a removable fastener that is not bolted in place and is positioned on or near the exterior of the removable door or one of the plurality of removable frames, thereby permitting removal of the removable door from the exterior of the transportable storm shelter without the use of tools.

14. The transportable storm shelter of claim 10 wherein the plurality of removable frames each comprises a bottom and the transportable storm shelter further comprises a spacer on the bottom of at least one of the plurality of removable frames to support the transportable storm shelter above a substrate, wherein the spacer is configured vertically between the plurality of removable frames to provide space between the at least one removable roof skin to ease the installation of the at least one removable roof skin during assembly and removal of the at least one removable roof skin during disassembly.

15. The transportable storm shelter of claim 1 further comprising a plurality of lengths of angle iron adapted to connect the two opposing sides.

16. An assembly kit for a transportable storm shelter for providing shelter from tornadoes, hurricanes, straight line winds and high wind weather events, the transportable storm shelter forming an interior space and comprising:
 a plurality of removable frames, wherein each of the plurality of removable frames has, in whole or in part a unitary planar geometry having an interior planar surface, an exterior planar surface and a perimeter and further comprises a flange extending radially from the perimeter;
 a plurality of removable skins, wherein each of the plurality of removable skins has an interior surface and is removably receivable on or within one of the plurality of removable frames;
 at least one removable fastener that is not bolted in place and is configured to hold at least one of the plurality of removable skins in assembled configuration with at least one of the plurality of removable frames, wherein the removable fastener is secured to the interior surface of the at least one of the plurality of removable skins and the at least one of the plurality of removable skins is configured to be removed from the at least one of the plurality of removable frames from the interior space of the transportable storm shelter by release of the removable fastener; and
 at least one removable roof skin comprising a unitary planar geometry, in whole or in part, and having an interior planar surface, an exterior planar surface, a perimeter and a flange extending radially from the perimeter of the removable roof skin;
 wherein the transportable storm shelter forms a rectangular prism having two opposing sides, each having a length, and two opposing ends, each having a length; the length of the two opposing sides is longer than the length of the two opposing ends; and
 the plurality of removable frames is configured to form the opposing sides of the transportable storm shelter.

17. The assembly kit of claim 16 wherein the unitary planar geometry of the removable frames comprises either a square or a rectangle.

18. The assembly kit of claim 16 wherein each of the plurality of removable frames forms an aperture located substantially centrally through the interior planar surface and the exterior planar surface of each of the plurality of removable frames.

19. The assembly kit of claim 16 wherein: each of the plurality of removable skins has a unitary planar geometry, in whole or in part, forming an interior planar surface and an exterior planar surface; and at least one of the plurality of removable skins is removably receivable within one of the plurality of removable frames such that the planar surface of the at least one of the plurality of removable skins is situated substantially parallel to the planar surface of one of the plurality of removable frames and anteriorly to the flange.

20. The assembly kit of claim 19 wherein the removable fastener is a hollow tube fastener comprising a hollow tube guide and a removeable pin receivable therethrough, wherein the hollow tube fastener is secured on the interior planar surface of the at least one of the plurality of removable skins to hold the at least one of the plurality of removable skins in assembled configuration within at least one of the plurality of frames.

21. The assembly kit of claim 20 wherein the hollow tube fastener is situated at an angle with respect to the interior planar surface of the at least one of the plurality of removable skins.

22. The assembly kit of claim 16 wherein the at least one removable roof skin is positioned atop one or more of the plurality of removable frames that are configured along each of the opposing sides of the transportable storm shelter and the flange of the at least one removable roof skin forms an apron flanking the transportable storm shelter when in assembled configuration.

23. The assembly kit of claim 22 further comprising a roof hollow tube fastener, the roof hollow tube fastener comprising a hollow tube and a pin receivable therethrough.

24. The assembly kit of claim 23 wherein the roof hollow tube fastener is positioned on the interior planar surface of the at least one removable roof skin to hold the at least one removable roof skin in assembled configuration with the flange of at least one of the plurality of removable frames.

25. The assembly kit of claim 22 wherein the at least one removable roof skin, when in assembled configuration with the at least one of the plurality of removable frames, is supported a distance above the plurality of removable frames, permitting light and air to pass under the apron of the at least one removable roof skin.

26. The assembly kit of claim 16 further comprising a removable end skin removably receivable at each of the opposing ends of the transportable storm shelter.

27. The assembly kit of claim 19 wherein one of the plurality of removable skins comprises a removeable door to the transportable storm shelter.

28. The assembly kit of claim 27 wherein the one of the plurality of removable skins comprising the removable door further comprises a removable fastener that is not bolted in place and is positioned on or near the exterior of the removable door or one of the plurality of removable frames, thereby permitting removal of the door from the exterior of the transportable storm shelter without the use of tools, when in assembled configuration.

29. The assembly kit of claim 25 wherein the plurality of removable frames each comprises a bottom and the transportable storm shelter further comprises a spacer on the bottom of at least one of the plurality of removable frames to support the transportable storm shelter above a substrate, when in assembled configuration, wherein the spacer is configured vertically between the plurality of removable frames to provide space between the at least one removable roof skin to ease the installation of the at least one removable roof skin during assembly and removal of at least one removable roof skin during disassembly.

30. The assembly kit of claim 16 further comprising a plurality of lengths of angle iron adapted to connect the two opposing sides.

* * * * *